United States Patent [19]

Pulli et al.

[11] Patent Number: 6,078,331
[45] Date of Patent: *Jun. 20, 2000

[54] METHOD AND SYSTEM FOR EFFICIENTLY DRAWING SUBDIVISION SURFACES FOR 3D GRAPHICS

[75] Inventors: Kari Antero Pulli, Seattle, Wash.; Mark Gordon Segal, Menlo Park, Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,818

[22] Filed: Sep. 30, 1996

[51] Int. Cl.[7] .................................................. G06T 17/00
[52] U.S. Cl. ............................................................ 345/423
[58] Field of Search .................................. 345/421, 422, 345/423, 425

[56] References Cited

U.S. PATENT DOCUMENTS

| | | | |
|---|---|---|---|
| 4,646,251 | 2/1987 | Hayes et al. | 345/423 |
| 4,930,092 | 5/1990 | Reilly | 345/423 |
| 5,428,718 | 6/1995 | Peterson et al. | 345/423 |
| 5,440,674 | 8/1995 | Park | 345/423 |
| 5,602,979 | 2/1997 | Loop | 345/423 |

*Primary Examiner*—Matthew M. Kim
*Assistant Examiner*—Huedung X. Cao
*Attorney, Agent, or Firm*—Wagner, Murabito & Hao LLP

[57] ABSTRACT

A process for efficiently drawing subdivision surfaces. The present invention operates within a computer system for visually displaying 3 dimensional (3D) surfaces on a display. The present invention pulls polygons from a polygon mesh of a 3D surface. The polygons are stored into a 2 dimensional array such that the vertices of the polygons occupy nodes of the 2 dimensional array and are readily accessed. The polygons are subsequently divided into a plurality of resulting polygons. The resulting polygons are then sent to a graphics pipeline, wherein the graphics pipeline renders the resulting polygons into a 3D image on the computer display.

31 Claims, 13 Drawing Sheets

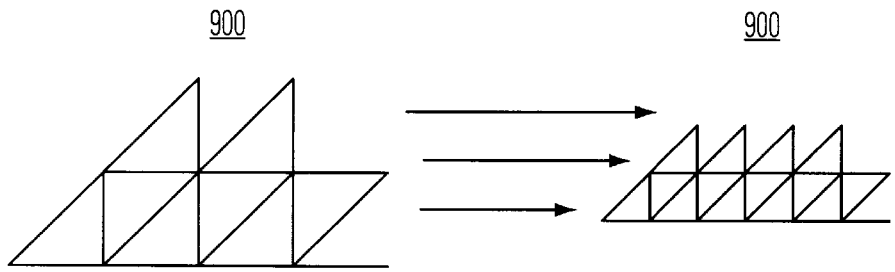
FIG. 9A          FIG. 9B
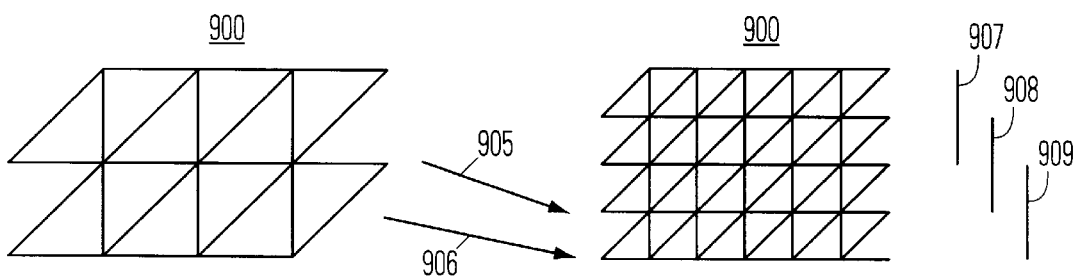
FIG. 9C          FIG. 9D

1200

| | vertex type | $C_0$ | $C_1$ |
|---|---|---|---|
| S | smooth or dart | $\pi/a(\pi) - \pi$ | 1 |
| S | crease | $\delta$ | $\delta_{01}$ |
| S | corner | 1 | 0 |
| S | conical | $b(n)$ | 1 |
| F | smooth or dart | $3nf(8n(n))$ | 1 |
| F | regular crease | 4 | $\delta_{01}$ |
| F | nonregular crease | 3 | $\delta_{01}$ |

METHOD AND SYSTEM FOR EFFICIENTLY DRAWING SUBDIVISION SURFACES FOR 3D GRAPHICS

FIELD OF THE INVENTION

The field of the present invention pertains to computer implemented graphics. More particularly, the present invention relates to a system and method for drawing subdivision surfaces in a three dimensional graphics environment.

BACKGROUND OF THE INVENTION

Computer graphics are being used today to perform a wide variety of tasks. Many different areas of business, industry, government, education, entertainment, and most recently, the home, are tapping into the enormous and rapidly growing list of applications developed for today's increasingly powerful computer devices. Graphical user interfaces have replaced textual interfaces as the standard means for user computer interaction.

Graphics have also become a key technology for communicating ideas, data, and trends in most areas of commerce, science, and education. Until recently, real time user interaction with three dimensional (3D) models and pseudo-realistic images was feasible on only very high performance workstations. These workstations contain dedicated, special purpose graphics hardware, and are typically very expensive. The spectacular progress of semiconductor fabrication technology has made it possible to do the same real time 3D animation, with color shaded images of complex objects, described by thousands of polygons, on rendering subsystems of only a few chips. The most recent and most powerful workstations are capable of rendering completely life-like, realistically lighted, 3D scenes.

In a 3D computer generated image, objects are typically described by data models. These models store descriptions of "primitives" (usually mathematically described polygons and polyhedra) that define the shape of the object, the object attributes, and the connectivity and positioning data describing how the objects fit together. The component polygons and polyhedra connect at common edges defined in terms of common vertices and enclosed volumes. The polygons are textured, Z-buffered, and shaded/illustrated onto an array of pixels, creating a realistic 3D image.

Many applications require the generation of smooth surfaces and smooth curves. To realistically generate a real-world image, the surfaces of objects in the image need to be realistically modeled. The most common representation for 3D surfaces are "polygon meshes." A polygon mesh is a set of connected, polygonally bounded, planar surfaces. Open boxes, cabinets, and building exteriors can be easily and naturally represented by polygon meshes. Polygon meshes, however, are less easily used to represent objects with curved surfaces.

Referring now to prior art FIG. 1A, a simple polygon mesh of a section 10 of a cone is shown, while prior art FIG. 1B shows an actual section 11 of a cone. Each polygon of the section 10 is a mathematical representation of a corresponding portion of the surface of the section 11. The interconnecting vertices (e.g., vertices 13) and the interconnecting edges of the polygons (e.g., edges 12) collectively define the surface of section 10 in 3D space. There are obvious short comings, however, in the accuracy of the section 10 in comparison to actual section 11. The polygons model the surface of section 11, but the representation is only approximate. The "errors" of the approximation can be made arbitrarily small by using more and more polygons to create an increasingly accurate piece wise linear approximation.

Referring now to prior art FIG. 2A, prior art FIG. 2B, and prior art FIG. 2C, an initial representation 21, an intermediate representation 22, and a final representation 23, are shown respectively. The initial representation 21 is a polygon mesh of a rain drop. As described above, initial representation 21 consists of a fewer number of polygons, leading to a "blocky," or geometrically aliased, representation of the rain drop. It should be noted that the polygons of initial representation 21 are comprised of triangles, whereas the polygons of section 10 are comprised of quadrilaterals. Regardless of the nature of the polygon primitive (triangle, quadrilateral, and the like) used to model a curved surface, the general properties, e.g., geometric aliasing, are substantially the same.

In proceeding from initial representation 21 to intermediate representation 22, the number of polygons in the polygon mesh of initial representation 21 are increased. Computer graphics engineers rely upon a technique known as surface subdivision to provide a straight forward method of increasing the number of polygons comprising a polygon mesh. In the subdivision technique, the polygons comprising the polygon mesh are each divided into a plurality of "daughter" polygons. The daughter polygons share most of the characteristics of the "parent" polygon, however, their position and orientation in 3D space is influenced by the position and orientation of neighboring daughter polygons. The nature and degree of this influence is implementation specific, i.e., particular algorithms cause differing effects. Subdivision algorithms determine the placement of the vertices and edges of the daughter polygons. In so doing, an exemplary subdivision algorithm utilizes not only information regarding the parent polygon, but also information regarding the connectivity of the parent polygon with its neighboring polygons. The subdivision algorithm places and connects the daughter polygons in 3D space such that the polygon mesh becomes a smoother, less geometrically aliased representation of the real life object being modeled. Thus, intermediate representation 22 is derived from initial representation 21 through subdivision processing, and after several iterations, final representation 23 is derived. It should be noted that although final representation 23 appears as a smooth, realistic, rain drop, final representation 23 is still a polygon mesh comprised of a large number of polygons in the same manner as initial representation 21. The much larger number of polygons in final representation 23 contribute to the smoother, more realistic appearance.

The subdivision algorithms described above are essentially a set of geometry based rules. A computer system implements these rules in the process of computing polygon subdivision, using the rules to manipulate the polygons of the mesh. A complex model can include many hundreds of thousands of polygons. In performing surface subdivision processing, the computer system needs to perform geometric manipulations on each of the polygons comprising the mesh, which can lead to severe computational loads. These computational loads often slow the graphics processing speed of the computer system.

In addition to the computational loads, the computer system has a finite amount of memory space. Each polygon in the mesh has a number of attributes which need to be stored, e.g., the coordinates of each of the vertices of the polygon, the connective relationship of the polygon in relation to its neighbors, the orientation of the polygon in 3D space, and the like. Thus, all though it is desirable to model an object with a large number of polygons in order to reduce geometric aliasing, increasing the number of polygons quickly consumes the memory resources of the computer system. Surface subdivision processing may provide a straight forward method of increasing the realism of a modeled object, but it also reduces the number of objects a computer system can simultaneously store and manipulate, surface subdivision processing geometrically increases the number of polygons in a modeled object. The lack of memory resources is thus, a limiting factor in the graphics process.

Typical prior art methods of storing polygons in memory grow increasingly cumbersome as the size (number of polygons) of the polygon mesh increases. Information regarding the coordinates of each of the vertices of the polygons, the connective relationship of the polygon in relation to its neighbors, and the like, are stored in data structures the computer system maintains in memory. Several pointers and indexing tables are required in order to access information regarding particular polygons and to subsequently access information about neighboring polygons. This slows the memory accessing process by requiring extra steps to index the particular polygons.

The large memory space occupied by a complex polygon mesh can also lead to a serialized, non-parallel graphics computation processing. The large polygon mesh typically fits only in a large data structure maintained in the computer system's main memory. Thus, even though the computer system may have a number of graphics co-processors, the large data structure is not easily adapted to parallel, hardware based acceleration. Most of the processing is handled by the CPU.

Thus, what is desired is a system for efficiently implementing surface subdivision in a polygon mesh. The system should be able to efficiently subdivide a curved surface using a minimum amount of memory. What is further desired is system for efficiently storing a complex polygon mesh. The system should store polygon attributes, e.g., the coordinates of each of the vertices of the polygon, the connective relationship of the polygon in relation to its neighbors, the orientation of the polygon in 3D space, and the like, in an easily indexed, easily accessed, data structure in memory. What is further desired is a surface subdivision system which lends itself to parallel computation in order to increase the speed of the 3D graphics process. The system of the present invention satisfies the above requirements.

SUMMARY OF THE INVENTION

The present invention includes a process for efficiently drawing subdivision surfaces. The present invention operates within a computer system for visually displaying 3 dimensional (3D) objects on a display. The process of the present invention pulls polygons from a polygon mesh of a 3D surface. The polygons are stored into a 2 dimensional array such that the vertices of the polygons occupy nodes of the 2 dimensional array and are readily accessed. The polygons are subsequently divided into a plurality of resulting polygons. The resulting polygons are then sent to a graphics pipeline, wherein the graphics pipeline renders the resulting polygons into a 3D image on the computer display.

In so doing, the present invention more efficiently implements surface subdivision in a polygon mesh. The system of the present can efficiently subdivide a curved surface using a minimum amount of memory. The system of the present invention efficiently stores a complex polygon mesh into the 2 dimensional array such that the polygon attributes, e.g., the coordinates of each of the vertices of the polygon, the connective relationship of the polygon in relation to its neighbors, the orientation of the polygon in 3D space, and the like, are easily indexed and easily accessed. The system of the present invention, in addition, is readily adapted to parallel computation in order to increase the speed of the 3D graphics process.

When the polygons comprising the polygon mesh are triangle polygons, the present invention pulls triangle polygon pairs from the polygon mesh of the 3D surface. The triangle polygon pairs are stored into the 2 dimensional array such that the vertices of the triangle polygon pairs occupy nodes of the 2 dimensional array and are readily accessed. The triangle polygons are subsequently subdivided in accordance with the present invention.

BRIEF DESCRIPTION OF THE DRAWINGS

The present invention is illustrated by way of example and not by way of limitation, in the figures of the accompanying drawings and in which like reference numerals refer to similar elements and in which:

FIG. 9A shows the first three rows of a triangle array before the initialization phase of the sliding window process of the present invention.

FIG. 9B shows the first three rows of the triangle array after the initialization phase of the sliding window process of the present invention.

FIG. 9C shows the original first three rows of the triangle array.

FIG. 9D shows the first six rows of the triangle array after subdivision to the next level.

DETAILED DESCRIPTION OF THE INVENTION

Figure 1A:
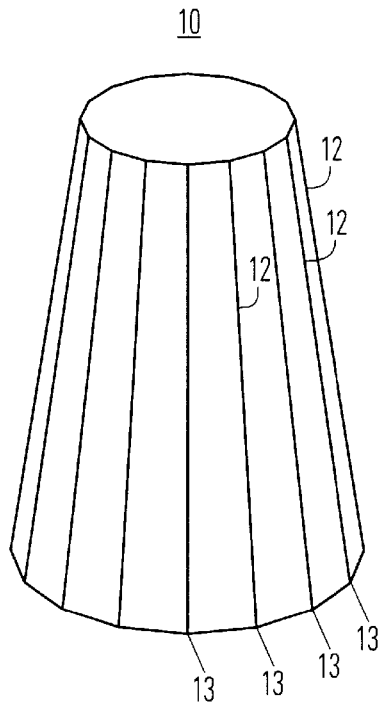
FIG. 1A shows a simple polygon mesh of a section of a cone of the prior art.
Figure 1B:
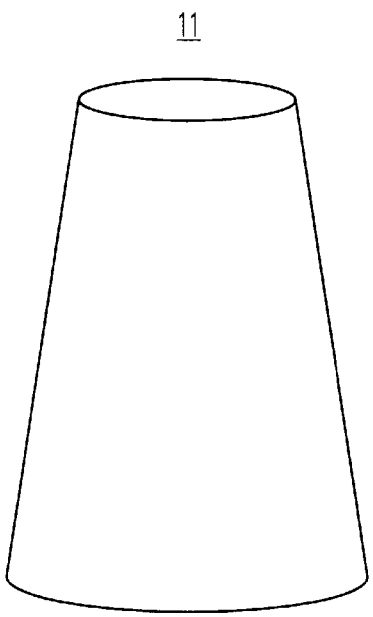
FIG. 1B shows an actual section of the cone of the prior art.
Figure 2A:
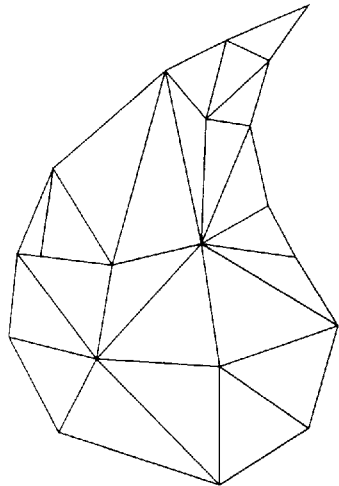
FIG. 2A shows an initial representation polygon mesh of the prior art.
Figure 2B:
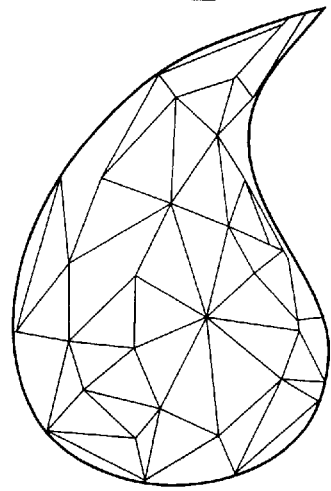
FIG. 2B shows an intermediate representation polygon mesh of the prior art.
Figure 2C:
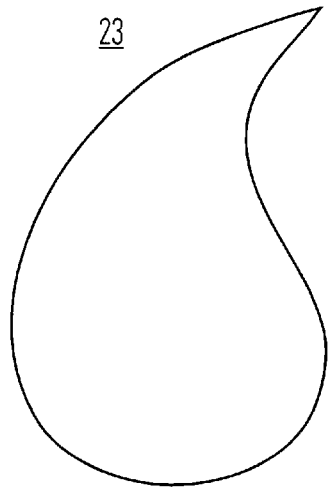
FIG. 2C shows a final representation polygon mesh of the prior art.

In the following detailed description of the present invention, a method and system for efficiently drawing subdivision surfaces, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "pulling" or "processing" or "computing" or "subdividing" or "storing" or "outputting" or "drawing" or the like, refer to the action and processes of a computer system (e.g., computer system 200 of FIG. 14), or similar electronic computing device, that manipulates and transforms data represented as physical (electronic) quantities within the computer system's registers and memories into other data similarly represented as physical quantities within the computer system memories or registers or other such information storage, transmission or display devices.

Modeling real life objects on a 3 dimensional computer system necessitates the generation of smooth surfaces and curved surfaces. A common surface modeling method is the polygon mesh technique. A polygon mesh is a collection of edges, vertices, and polygons connected such that each edge is shared by at most two polygons. An edge connects two vertices, and a polygon is a closed sequence of edges. An edge can be shared by two adjacent polygons, and a vertex is shared by at least two edges. Each vertex has an X, Y, and Z coordinate in 3D space. The mathematical descriptions of the polygons are referred to as primitives. The collection of polygons in its entirety, along with connectivity and attribute information, model an object.

Smooth, flat surfaces readily lend themselves to 3D modeling using a polygon mesh. Curved surfaces are more difficult to accurately model. Since a polygon is essentially a plane defined by the component vertices, a curve modeled using a polygon mesh typically appears "blocky" or geometrically aliased. To overcome geometric aliasing, large numbers of polygons are used to model curved surfaces. Although each polygon remains essentially planar, collectively, the larger number of polygons comprising the curved surface reduce geometric aliasing and increases the accuracy of the model. Computer graphics engineers use a technique known as surface subdivision as a method of increasing the number of polygons modeling a curved surface, and thus, increasing the accuracy of the model.

Subdivision surfaces provide a curved surface representation which is useful to a number of computer graphics applications, e.g., modeling surfaces of arbitrary curvature type, geometric compression, and automatic level of detail generation. A subdivision surface results from iteratively refining a "control" mesh of arbitrary topology by adding new polygon vertices (and thus new polygons) into the polygon mesh and modifying the locations of existing polygon vertices. Subdivision essentially divides each polygon in the mesh into a plurality of resulting polygons, which are subsequently further divided into even more resulting polygons. As the polygons of the mesh are thus iteratively subdivided, the size of the resulting polygons approaches a limit (essentially, zero). At the limit, the mesh converges to a continuous surface. While the control mesh usually gives a rough, geometrically aliased polygon approximation of the curved surface, after subdivision processing, the resulting mesh appears as a smooth, continuous, curved surface. It should be noted that the subdivision surface technique is equally suited to use with polygon meshes where the component polygons are quadrilaterals (quadrilateral mesh), or where the component polygons are triangles (triangle mesh). The present invention includes a process for efficiently drawing subdivision surfaces.

Figure 3A:
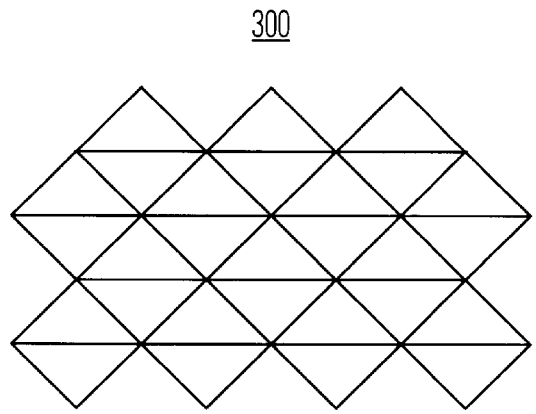
FIG. 3A shows a curved surface modeled by a plurality of polygons.

Referring now to FIG. 3A, a curved surface modeled by a plurality of polygons comprising a polygon mesh 300, before subdivision using the present invention, is shown. In this example, the polygons are comprised of triangles. As described above, each of the polygons comprising the polygon mesh 300 share edges and vertices with neighboring polygons. Each polygon of the polygon mesh 300 is, in this example, a planar triangle having three vertices, with each vertex having an x, y, and z coordinate in 3D space, thus, defining the polygon's position and orientation in 3D space. The plurality of polygons comprising polygon mesh 300 in FIG. 3A, along with their respective connectivity and attribute information, model the curved surface.

Figure 3B:
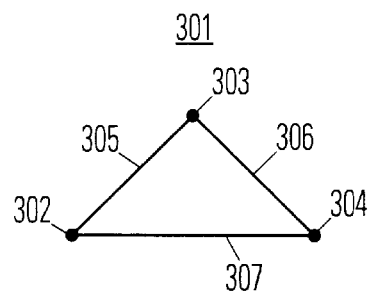
FIG. 3B shows an exemplary polygon of the plurality of polygons shown in FIG. 3A.

FIG. 3B shows an exemplary polygon 301 out of the plurality of polygons comprising polygon mesh 300. As described above, polygon 301 has 3 vertices 302, 303, and 304 (hereafter vertices 302–304), and each of vertices 302–304 are connected via edges 305, 306, and 307 (hereafter edges 305–307). The subdivision process of the present invention subdivides polygon 301 into a plurality of resulting polygons. The subdivision process proceeds by splitting each of edges 305–307 into a plurality of resulting edges and inserting a plurality of resulting vertices connecting the resulting edges.

Figure 3C:
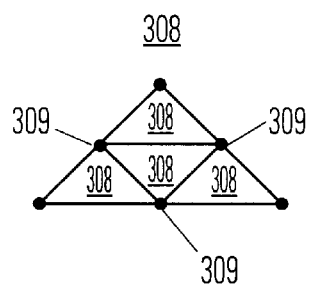
FIG. 3C shows a plurality of resulting polygons arising from the subdivision process of the present invention.

FIG. 3C shows a plurality of resulting polygons 308 arising from the subdivision process in accordance with the present invention. Polygon 301 has been subdivided into a plurality resulting polygons 308. Resulting vertices 309 have been placed along edges 305–307 such that polygon 301 is subdivided into 4 resulting polygons 308. In this manner, each of the plurality of polygons comprising polygon mesh 300 is subdivided into a plurality of resulting polygons, and subsequently subdivided again, and iteratively again, until the size of the new resulting polygons approach the limit. Thus, theoretically, polygon mesh 300 merges into a virtually continues, smooth, curved surface. In actuality, however, as the subdivision process of the present invention geometrically increases the number of resulting polygons comprising polygon mesh 300, the process is complete when the resulting polygons are small enough eliminate perceptible geometric aliasing in the modeled curved surface. This conserves memory resources of the computer system.

The present invention includes a process for efficiently drawing subdivision system, using the computer system to visually display 3 dimensional (3D) surfaces on a display device. The process of the present invention proceeds using polygons from the polygon mesh of a 3D object. The polygons are stored into a 2 dimensional array such that the vertices of the polygons occupy nodes of the 2 dimensional array and are readily accessed. Thus, the computationally intensive subdivision process can proceed with greater speed due, in part, to the more efficient access afforded by the 2 dimensional array. The polygons are subsequently divided into a plurality of resulting polygons. The resulting polygons are then sent to a graphics pipeline, wherein the graphics pipeline renders the resulting polygons into a 3D image on the computer display.

In so doing, the present invention more efficiently implements surface subdivision in a polygon mesh. The system of the present can efficiently subdivide a curved surface using a minimum amount of memory. The system of the present invention efficiently stores a complex polygon mesh into the 2 dimensional array such that the polygon attributes, e.g., the coordinates of each of the vertices of the polygon, the connective relationship of the polygon in relation to its neighbors, the orientation of the polygon in 3D space, and the like, are easily indexed and easily accessed. The system of the present invention, in addition, is readily adapted to parallel computation in order to increase the speed of the 3D graphics process. The present invention, along with its benefits and advantages, are described in greater detail below.

There are two common types of polygons used in polygon meshes; a triangle polygon having 3 vertices and 3 edges, and a quadrilateral polygon having 4 vertices and 4 edges. As such, it should be appreciated that the system of the present invention is adapted to operate on polygon meshes comprised of either triangle polygons, or quadrilateral polygons. Where the system of the present invention operates with triangle polygons, the polygons of the polygon mesh are manipulated in pairs, two at a time, until all polygons comprising the polygon mesh are processed. Where the system of the present invention operates with quadrilateral polygons, the polygons of the polygon mesh are manipulated singularly, until all polygons comprising the polygon mesh are processed. The operation of the system of the present invention with triangle polygons is described below.

Figure 4A:
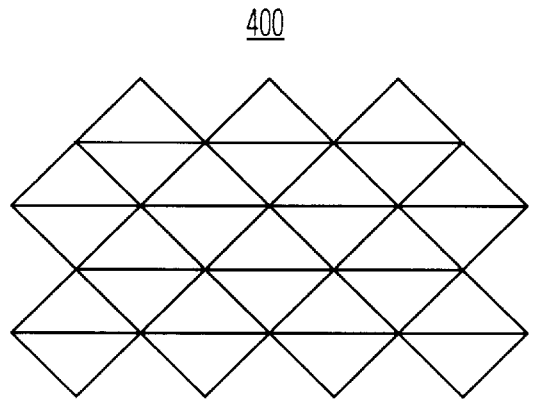
FIG. 4A shows a polygon mesh comprised of triangular polygons.

Referring now to FIG. 4A, a polygon mesh 400 comprised of triangular polygons is shown. The polygon mesh 400 is comprised of a plurality of triangular polygons (triangles) which collectively model a curved surface. Each triangle in the polygon mesh has three vertices, with each vertex having an x, y, and z coordinate in 3D space. The plurality of triangles comprising polygon mesh 400 in FIG. 4A, along with their respective connectivity and attribute information, model the curved surface, in the manner described above.

Figure 4B:
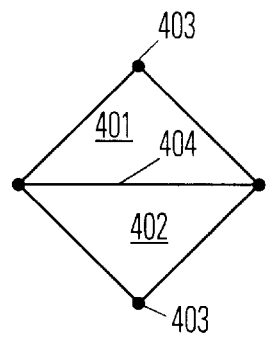
FIG. 4B shows a pair of triangles pulled from the polygon mesh of FIG. 4A.

FIG. 4B shows a pair of triangles, 401 and 402, "pulled" from polygon mesh 400. The pair of triangles 401–402 share two vertices 403 and a common edge 404. Triangle 401 and triangle 402 are each subdivided in the manner described above, yielding a plurality of resulting triangles.

Figure 4C:
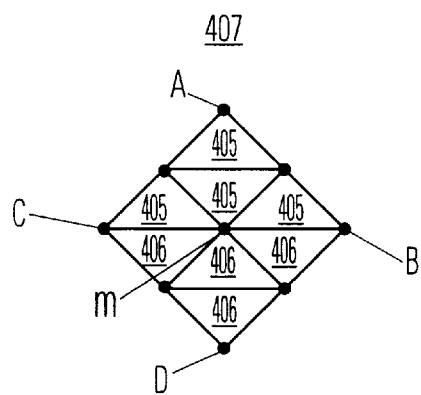
FIG. 4C shows the plurality of resulting triangles from the triangle pair of FIG. 4C.

Referring now to FIG. 4C, the plurality of resulting triangles 407 from the triangle pair 401–402 are shown. Triangle 401 is subdivided into 4 resulting triangles 405, and triangle 402 is subdivided into 4 resulting triangles 406. Each subsequent iteration splits all the edges of the triangles 407 and introduces four new triangles from each previous triangle. The location of each new vertex is defined by a subdivision rule. It should be appreciated that the system of the present invention is suited to use with a number of different subdivision rules. As such, the subdivision algorithm of the present implementation of the invention locates each new vertex by determining a weighted average of the surrounding vertices. Using the plurality of resulting triangles 407, the relationship may be expressed as:

$$m=(A+3B+3C+D)/8$$

where "m" is the location of the "center" vertex. Each iteration also perturbs the locations of existing vertices by taking a weighted average of the locations of the vertex and its immediate neighbors. Thus, each resulting vertex influences the location of its neighboring vertex in the same manner that the location of the resulting vertices are determined by the location of the previous vertices. To determine the location of resulting vertices, the system of the present invention uses information contained in each of the surrounding neighbor vertices. Thus, as the subdivision process proceeds, there are a large number of accesses to a data structure maintained in memory where the attributes of the polygon mesh 400 is stored.

The location of each resulting vertex in a subdivision surface is dependent upon information associated with each of the surrounding neighbor vertices, as described above. Because of this, the polygon mesh is stored in memory in such a manner that the information associated with the vertices of the subdivision surface can be indexed and accessed. In typical prior art methods, a polygon mesh is stored in memory using a variety of data structures, e.g., explicit polygon lists, pointers to a vertex list, pointers to an edge list, and the like. In the present invention, however, the polygon pairs are stored into a 2 dimensional array such that the vertices of the polygon pairs occupy nodes of the 2 dimensional array and are more readily accessed than any of the previous, prior art methods.

Figure 5A:
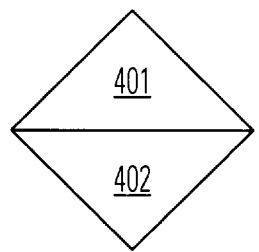
FIG. 5A shows the pair of triangles from FIG. 4B.
Figure 5B:
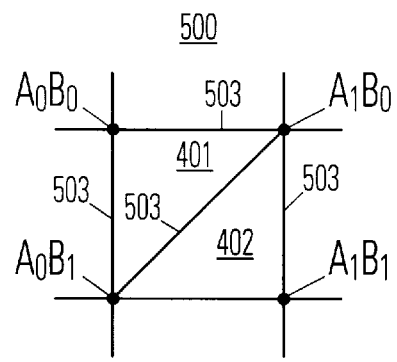
FIG. 5B shows the pair of triangles from FIG. 4B stored in a portion of a 2 dimensional array data structure in accordance with one embodiment of the present invention.
Figure 5C:
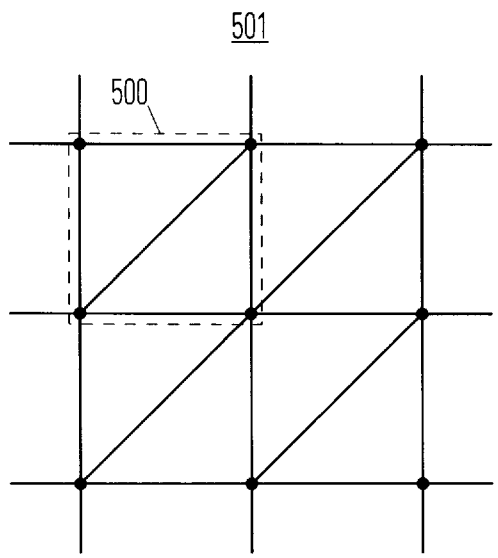
FIG. 5C shows the relationship between the portion of the array from FIG. 5B and the rest of the 2D array data structure.

FIG. 5A shows the pair of triangles 401 and 402, FIG. 5B shows the pair of triangles 401 and 402 stored in a portion 500 of a 2 dimensional array data structure in accordance with one embodiment of the present invention, and FIG. 5C shows the relationship of the portion 500 to the rest of a 2 dimensional array data structure 501 in accordance with the present invention. Four "nodes" of the 2 dimensional array data structure 501 (hereafter array 501) are shown. Each node in the array 501 has both a "row" component address and a "column" component address. Thus, the vertices of the pair of triangles 401 and 402 are stored at nodes A0B0, A1B0, A0B1, and A1B1. It should be appreciated that the plurality of lines 503 connecting nodes A0B0, A1B0, A0B1, and A1B1, are shown only to illustrate the connectivity information of the vertices stored in the nodes. The plurality of lines 503 do not illustrate any spatial relationship regarding the pair of triangles 401 and 402.

In FIG. 5C, the relationship between the portion 500 and the rest of the array 501 is shown. The array 501 stores all the triangles of a polygon mesh in the manner described above. Each triangle in the polygon mesh 400 is pulled (essentially, identified as a pair, counted, and removed from the mesh) from the mesh in pairs and stored in the array such that the triangle pairs are stored into the array "beside" neighboring triangle pairs. This greatly simplifies the indexing and accessing of information from neighbor triangles involved in processing a subdivision surface.

Referring still to FIG. 5C, the array 501 is a simple 2 dimensional array, and represents a very simple data structure for describing points on a surface. A pair of triangles from the triangle mesh 400 inherently combine to form a quadrilateral having 4 vertices. This provides a very natural mapping from the pulled triangle pairs into the "square" array 501. Connectivity information need not be stored with the vertices because the connectivity information exists in the structure of the array 501. The neighboring triangle pairs are stored in adjacent array locations. This eliminates the need to resort to looking up an adjacent triangle, (or any other type of polygon) in an index, or in an explicit polygon list, as was common in the prior art.

Figure 6A:
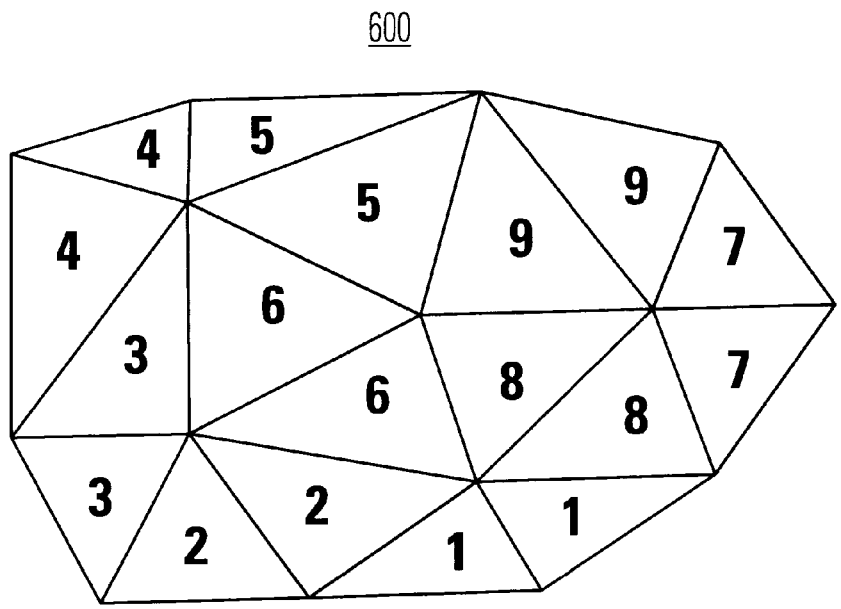
FIG. 6A shows a portion of a polygon mesh.
Figure 6B:
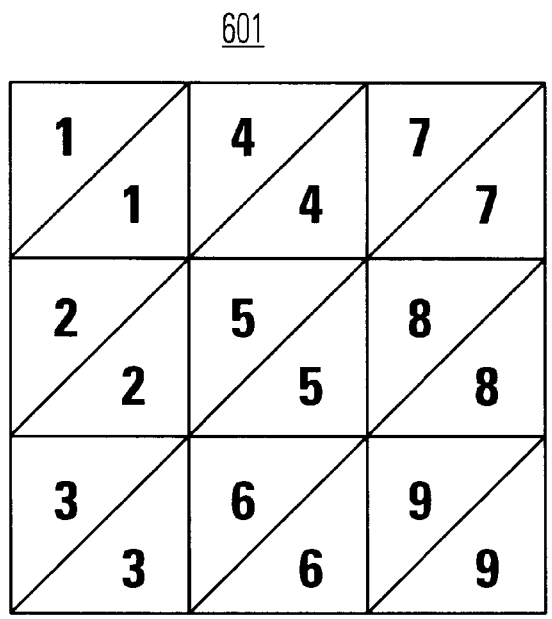
FIG. 6B shows a the portion of the polygon mesh from FIG. 6A stored into a 2D array data structure in accordance with one embodiment of the present invention.

FIG. 6A shows a portion of a polygon mesh 600 and FIG. 6B shows the portion of the polygon mesh 600 stored into a 2 dimensional array data structure 601 in accordance with one embodiment of the present invention. Each triangle comprising the polygon mesh 600 is numbered in order to illustrate the manner in which the triangles are stored in the 2 dimensional array data structure 601. The 2 dimensional array data structure (hereafter array) 601 of the present invention eliminates the need for inefficient and time consuming explicit polygon lists, pointers to a vertex list, pointers to an edge list, and the like. Neighbor polygon information is accessed in a simple, fast manner (e.g., moving up one pair and over one pair). It should be appreciated that each edge and vertex of a triangle can be of a differing type, and the type can be stored, along with other information, at the array 601 locations. However, only the original edge and vertex types need to be stored. The vertex and edge types can be deduced from the location in the array 601. Should additional information to accurately model "corners" of a curved surface be required, the additional information can be stored in an additional array (not shown). Thus, the array 601 in accordance with the present invention stores polygon pairs (whether triangles or other types of polygons) in a manner such that they are easily indexed and easily accessed.

Figure 7A:
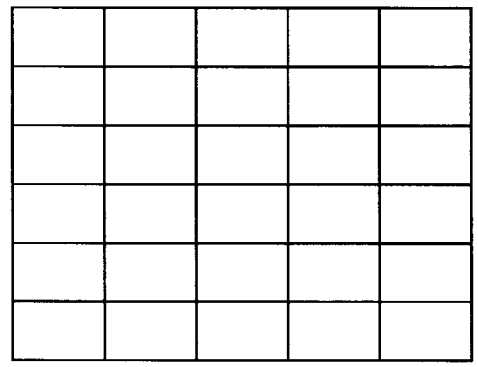
FIG. 7A shows a portion of a polygon mesh where the polygons are quadrilateral polygons.
Figure 7B:
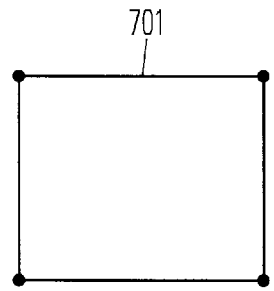
FIG. 7B shows a single quadrilateral out of the polygon mesh of FIG. 7A.
Figure 7C:
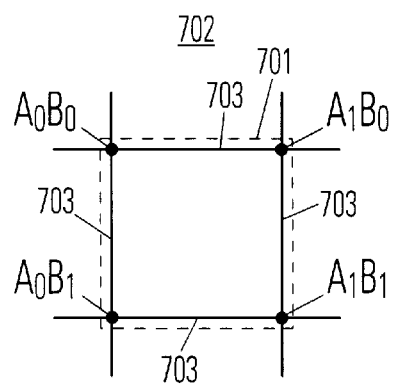
FIG. 7C shows the quadrilateral from FIG. 7B stored in a portion of the 2D array data structure in accordance with one embodiment of the present invention.

FIG. 7A shows a portion of a polygon mesh 700 wherein the polygons are quadrilateral polygons (hereafter quadrilaterals), FIG. 7B shows a single quadrilateral 701 out of the polygon mesh 700, and FIG. 7C shows quadrilateral 701 stored in a portion 702 of a 2 dimensional array data structure 702 (hereafter array 702) in accordance with one embodiment of the present invention. Quadrilateral 701 is stored in the array 702 in the same manner as the triangle described above. The four nodes of the array 702 store the four vertices of quadrilateral 701. The primary difference is that since quadrilateral 701 inherently has 4 vertices, there is no need to pair quadrilaterals in order to easily match the "square" nature of array 702. Thus, in the case of a polygon mesh comprised of quadrilateral polygons, the present invention pulls each quadrilateral from the polygon mesh without pairing the quadrilaterals. The quadrilaterals are subsequently stored in array 702. As described above, it should be appreciated that the plurality of lines 703 connecting nodes A0B0, A1B0, A0B1, and A1B1, are shown only to illustrate the connectivity information of the vertices stored in nodes A0B0, A1B0, A0B1, and A1B1. As such, the plurality of lines 703 do not illustrate any spatial relationship regarding the vertices of quadrilateral 701. Thus, the present invention can directly store quadrilateral polygons into array 702, while the present invention needs to pair triangle polygons before storing them into the array 702.

The present invention, in order to store triangles in pairs, partitions the polygon mesh into pairs of neighboring triangles. When the present invention operates with a polygon mesh comprised of triangle polygons, the present invention uses a pairing algorithm to pull triangles from the polygon mesh in such a manner as to minimize the number of triangles whose neighbors have already been paired with other triangles, or the number of triangles left over without neighbors. The pairing algorithm of the present invention seeks to generate a unique pair for each triangle in the polygon mesh and to avoid breaking the polygon mesh into disconnected parts.

The pairing algorithm proceeds as follows. Each triangle is inserted into one of four priority sets depending on how many free (unpaired) neighboring triangles the triangle has. See the table below.

| Priority set | Number of free neighboring triangles |
| --- | --- |
| 3 | 0 or 1 |
| 2 | 2, one of the free neighboring triangles not in set 3 |
| 1 | 2, both free neighboring triangles in set 3 |
| 0 | 3 |

Triangles with 0 or 1 free neighboring triangles are assigned the highest priority (3), and the triangles with 3 free neighbors are assigned the lowest priority (0). Of the remaining triangles (those with 2 free neighbors), the triangles with both neighboring triangles in set 0 are assigned lower priority (1). The algorithm chooses a triangle from the highest non-empty set and pairs it with the neighbor of highest priority. The paired triangles are then pulled from the sets, and their remaining neighbors are promoted to a higher priority set (e.g., from priority set 1 and 2 to priority set 3, from priority set 0 to priority set 1). Additionally, all the triangles in priority set 1 with a free neighbor not in priority set 0 are promoted to priority set 2. When each of the priority sets are empty, all triangles have been paired and pulled from the polygon mesh.

FIG. 8A through FIG. 8E shows the differing cases of triangle pairing. The pairing algorithm of the present invention seeks to generate a unique pair for each triangle in the polygon mesh and to avoid breaking the polygon mesh into disconnected parts. As such, it should be appreciated that the present invention can be adapted to function using differing triangle pairing algorithms. The primary cases (i.e., triangle pairing situations) of the triangle pairing algorithm of the present embodiment are described in greater detail below.

Figure 8A:
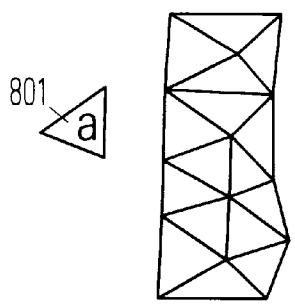
FIG. 8A shows a triangle under consideration which has no neighboring triangles.

FIG. 8A shows a triangle under consideration 801 which does not have any free neighbors. In this case, if the highest non empty priority set is 3 and the triangle under consideration does not have any free neighbors, it is paired with a "dummy mate" (tagged such that the dummy mate will not be rendered) and pulled. The number of boundary edges is thus reduced by three, and pulling the pair of triangles does not produce discontinuous polygon meshes.

Figure 8B:
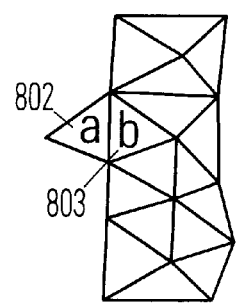
FIG. 8B shows a triangle under consideration which has only one free neighboring triangle.

FIG. 8B shows a triangle under consideration 802 which has only one free neighbor 803. In this case, if the triangle under consideration 802 has only 1 free neighboring triangle 803, it is paired with the neighbor triangle 803 and pulled. In some circumstances this pairing could produce discontinuous polygon meshes, however, the pairing is still the best available choice. Even though neighbor triangle 803 may be needed to optimally pair with some other triangle, if neighbor triangle 803 is not paired with triangle under consideration 802, triangle under consideration 802 will be left alone. Thus, in this case, the number of boundary edges may stay the same, or is reduced by up to four.

Figure 8C:
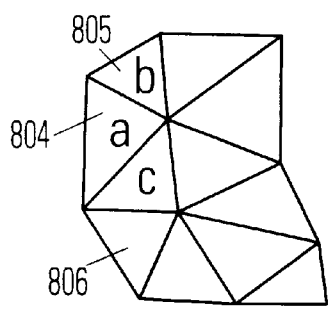
FIG. 8C shows a triangle under consideration having two neighboring triangles.

FIG. 8C shows a triangle under consideration 804 having two neighbor triangles 805 and 806. In this case, if the highest non empty priority set is 2, one of the neighbor triangles, either triangle 805 or triangle 806, must belong to priority set 2 (in this example, triangle 805, while triangle 806 belongs to priority set 0). The triangle under consideration 804 is paired with neighbor triangle 805 rather than neighbor triangle 806, because if triangle under consideration 804 is paired with neighbor triangle 806, the number of boundary edges remaining is increased by one. Pairing triangle under consideration 804 with neighbor triangle 805 keeps the number of boundary edges the same. It should be noted that in this case, it is possible to produce discontinuous polygon meshes (i.e., disconnecting the polygon mesh), thus, triangles in priority set 2 which do not disconnect the polygon mesh are given precedence.

Figure 8D:
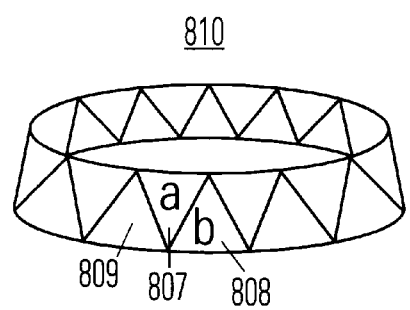
FIG. 8D shows a triangle under consideration having two neighboring triangles where each triangle has a boundary edge.

FIG. 8D shows a triangle under consideration 807 having two neighbor triangles 808 and 809, where each of triangles 807, 808, and 809 have a boundary edge. In this case, if the highest non empty priority set is 1, the polygon mesh 810 has a regular structure at the boundary. Each triangle in polygon mesh 810 has two neighbor triangles that include only a boundary vertex. In this case, the pairing algorithm of the present invention pairs triangle under consideration 807 with neighbor triangle 808 and directly proceeds to pair and remove the remaining triangles in polygon mesh 810, in a cascading fashion (neighbor triangle 809 is promoted to priority set 3). In this case, polygon mesh 810 cannot be disconnected.

Figure 8E:
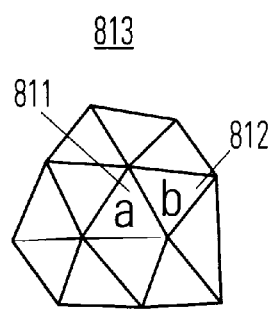
FIG. 8E shows a triangle under consideration having two neighboring triangles in a triangle mesh just beginning the triangle pulling process of the present invention.

FIG. 8E shows triangle under consideration 811 and a neighbor triangle 812 in a polygon mesh 813 just beginning the triangle pair pulling process of the pairing algorithm. In this case, the highest non empty priority set is 0, which can occur only in the beginning if polygon mesh 813 forms a closed surface. The pairing algorithm of the present invention pairs triangle under consideration 811 with neighbor triangle 812 and pulls the pair from polygon mesh 813. The number of boundary edges increases by 4 and polygon mesh 813 remains connected.

At the completion of the storing process (e.g., when polygons comprising a polygon mesh have been pulled and stored into a 2 dimensional array), the polygons easily indexed and easily accessed. These features make the surface subdivision process of the present invention well suited to parallel processing techniques. The process of the present invention uses a minimum of memory and is much simpler in data structure than prior art methods (e.g., explicit polygon lists, pointers to a vertex list, pointers to an edge list, and the like). Many computer systems include a number of graphics co-processors (e.g., geometry engines). These graphics co-processors are optimized to perform graphics computations very efficiently. As such, they do not contain the necessary hardware (e.g., virtual memory managers) for handling large data structures. The 2 dimensional array data structure of the present invention allows the partitioning of polygon subdivision tasks and the subsequent assigning of the tasks to the number of graphics co-processors. The graphics co-processors then process the polygon subdivisions in parallel. This greatly speeds the performance of computer systems having a number of graphics co-processors. The same is true for computer systems having a number of CPUs instead of a number of graphics co-processors, or any combination of the two. The parallel execution enabled by the present invention greatly speeds performance.

Once the polygons comprising a polygon mesh are stored in a 2 dimensional array, the present invention subdivides the polygons into resulting polygons. The subdivision methods of the prior art, even with a clever implementation, uses memory on the order of the final size of the output (total number of resulting polygons). With each iteration, the present invention quadruples the number of triangles. To avoid rapidly consuming memory resources, the present invention utilizes a "sliding window" approach that incrementally calculates the vertex coordinates, renders the triangles as soon as they are calculated, and subsequently reuses the memory. The sliding window technique enables a larger number of iterations, subdividing several levels deeper, than prior art methods using the same amount of memory. The sliding window technique of the present invention needs to store only a "window" of three rows of the 2D array for each level of subdivision, plus two rows for the final vertex coordinates and normal vectors. As the sliding window process proceeds, the window "slides" down the 2D array, processing three rows at a time.

FIG. 9A shows the first three rows of a triangle array 900 before the initialization phase of the subdivision process and FIG. 9B shows the array 900 at the second subdivision level, j+1, after the initialization phase of the subdivision process. In the initialization phase of the sliding window subdivision process, the first three rows are undivided and at level "j". The present invention splits the diagonal and vertical edges between the first and second row vertices.

The first row support vertices at subdivision level j+1 are obtained by splitting the diagonal and vertical edges between the first and second row vertices. In a similar manner, the second row is obtained by splitting the horizontal edges and updating the vertices. The third row is obtained by splitting the vertical and diagonal edges connecting the second and third rows at subdivision level j. Thus, the sliding window initializes three rows at a time.

FIG. 9C shows the first three rows of a triangle array 900, and FIG. 9D shows the array 900 at the final subdivision level. After the top 3 rows have been initialized, the recursive portion of the subdivision process begins. A next row of vertices is introduced under the 3 initialized rows, shown by arrow 905. Arrow 905 shows how a new row of edges at level j provides the neighbors needed for splitting the horizontal edges and updating the vertex coordinates in the middle row. The new and updated vertices become the new low row at level j+1, and they are written over the old highest row at that level. The above process is repeated in the same manner, going from level j+1 to j+2.

The new row at level j (arrow 905) also enables the present invention to split the diagonal and vertical edges connecting the level j low and middle rows, which produces yet another new row for level j+1, shown by arrow 906. The introduction of the lowest row from the array 900 in FIG. 9C (arrow 906) enables the calculation of the bottom two rows in the array 900 in FIG. 9D. Bar 907, bar 908, and bar 909 shows the vertical position of the sliding window before the split of the horizontal edges, after the split of the horizontal edges, and after the split of the vertical and diagonal edges, respectively. Thus, in this manner, the sliding window process of the present invention writes new rows over old rows and descend towards the final subdivision level, n. At the final subdivision level, with each new row, the final coordinates and normals for the middle row vertices are calculated and another triangle "strip" is output to the graphics pipeline of the computer system for rendering.

Figure 10:
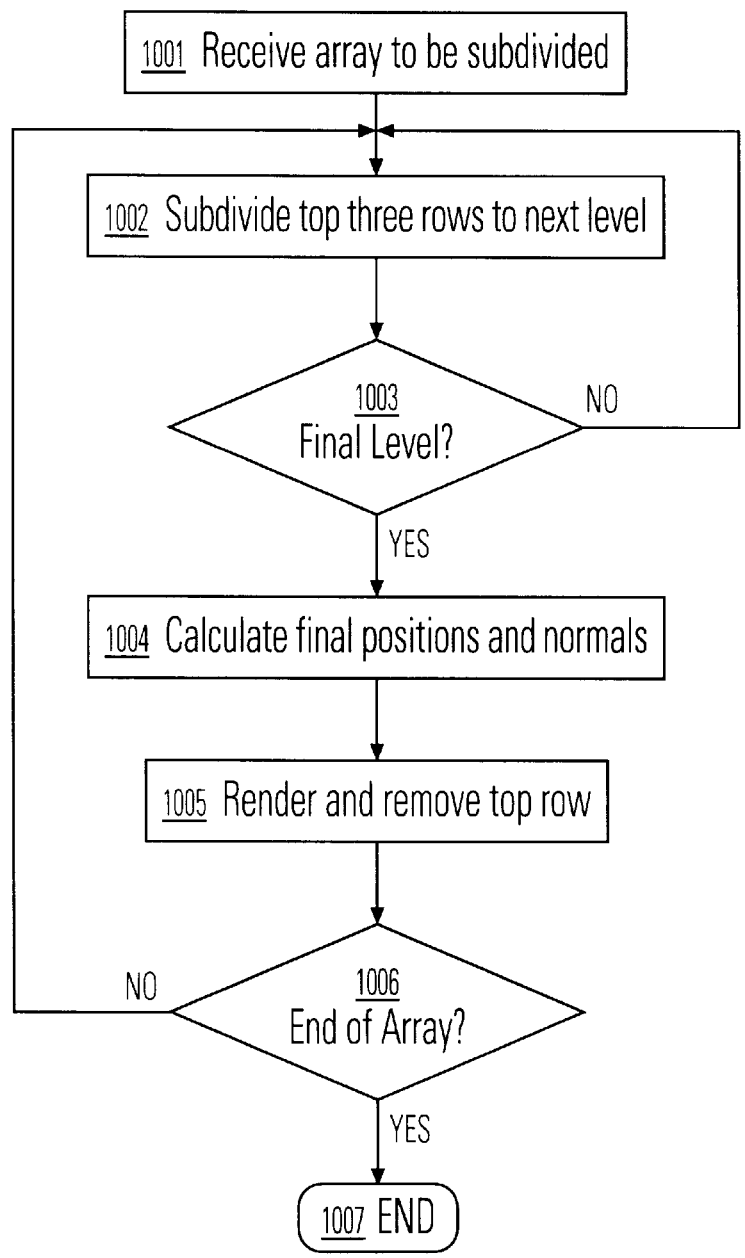
FIG. 10 shows a flow chart of the steps of one embodiment of the sliding window process of the present invention.

FIG. 10 shows a flow chart of the steps 1000 of one embodiment of the sliding window process of the present invention. In step 1001, the sliding window process of the present invention receives a 2D array to be subdivided. In step 1002, the present invention subdivides the top three rows of the 2D array by initializing and then subdividing them to the next level (e.g., j+1). This subdivision, in addition to creating new entries for the middle row of level j, creates two new rows: one row above and one row below the middle row from level j. These three rows (the two new rows and the updated middle row from level j) form the three rows for level j+1. In step 1003, the recursive part of the sliding window process begins. If the three rows are to be subdivided further (i.e., j+1 is not the final subdivision level), the sliding window process of the present invention reiterates step 1002, taking the three rows and further subdividing them (e.g., to j+2). In this manner, step 1002 is repeated until the top three rows are subdivided to the final subdivision level n.

At the final subdivision level, the sliding window process of the present invention proceeds to step 1004. In step 1004, the sliding window process of the present invention calculates the final coordinates and normals for the middle row out of the three rows.

In step 1005, this middle row has been subdivided to the final level. The first row was already subdivided to the final level in a previous step. The vertices stored in these two rows of the 2D array are taken together and used to form a contiguous strip of polygons. These polygons are output to the graphics pipeline of the computer system for rendering. The top row is then removed from the 2D array so that the storage space can be reused in subsequent steps. The middle row is retained, becoming the top row, while the bottom row becomes the middle row. In step 1006, the present invention determines whether there are remaining rows in the 2D array to subdivide. If there are rows remaining, the first of these rows becomes the bottom row, and the sliding window process returns to step 1002 and processes the next top, middle, and bottom rows. The process iteratively continues, with strips of polygons, (one strip as each group of three rows is processed) continually being output as the sliding window "slides" down the 2D array, until there are no more remaining rows. At that point, the process ends in step 1006.

A pseudo code procedure outlining one embodiment of the sliding window process of the present invention is shown below:

```
SUBDIVIDE (level, last)
BEGIN
    IF (level != last) THEN
        split horizontal edges, update vertices
        SUBDIVIDE (level + 1, last)
        split vertical and diagonal edges
    ELSE
        calculate final positions and normals
        render a triangle strip
    ENDIF
END
```

It should be appreciated that the sliding window process of the present embodiment is often implementation specific and changes with the different types of polygons the present invention processes (e.g., quadrilateral polygons instead of triangle polygons). As such, the present invention is well suited to utilize differing sliding window algorithms, and thus, differing pseudo code procedures.

Thus, the surface subdivision process of the present invention efficiently subdivides curved surfaces using a minimum amount of memory. The 2D array of the present invention efficiently stores complex polygon meshes such that the polygon attributes are easily are easily indexed and easily accessed. The sliding window process of the present invention efficiently reuses memory, continually outputting strips of fully subdivided polygons for rendering. Due to the efficient storage characteristics of the 2D array and the memory conserving characteristics of the sliding window process, the surface subdivision process of the present invention is well suited to parallel execution in a number of graphics co-processors, a number of CPUs, or any combination of the two. In this manner, the surface subdivision process of the present invention efficiently implements surface subdivision of polygon meshes. A flow chart of the steps of the present surface subdivision process is described below.

Figure 11:
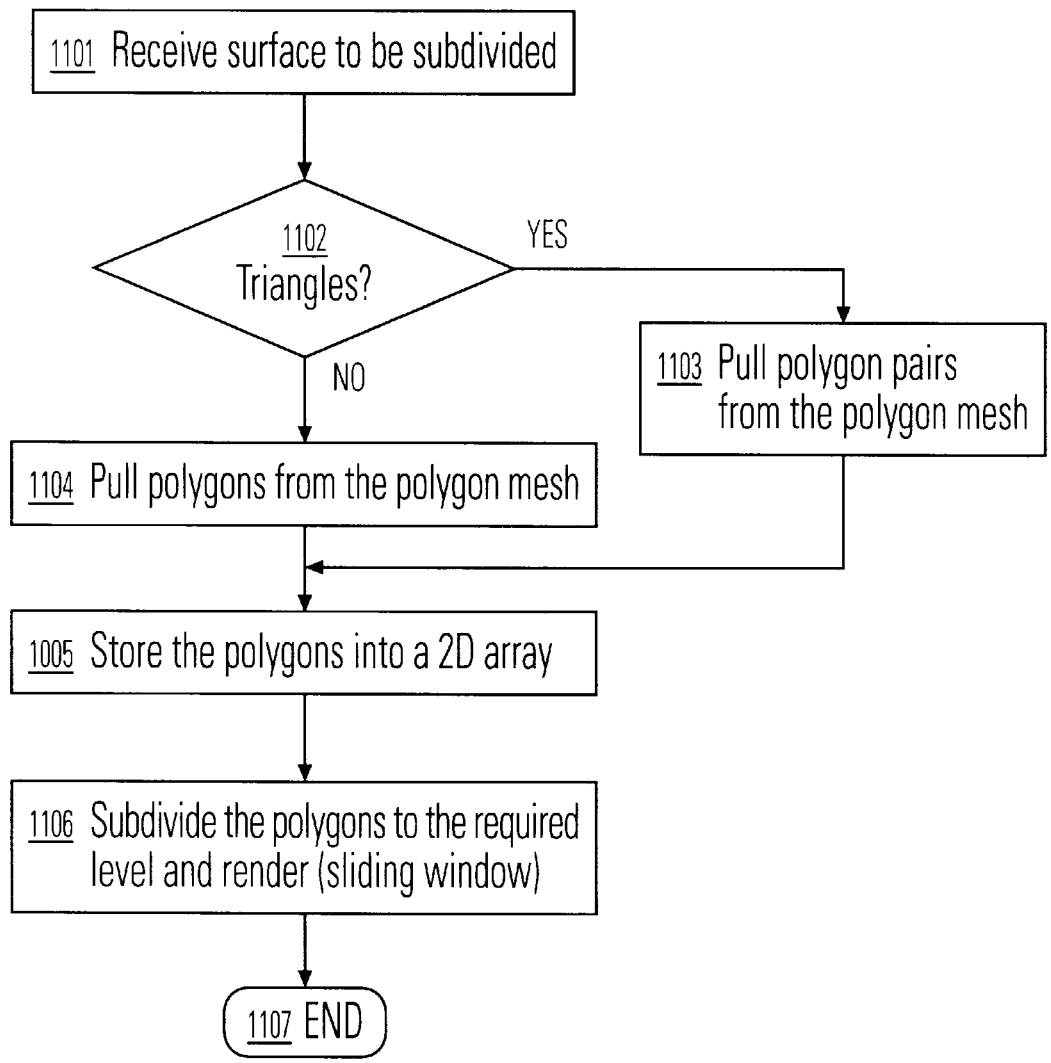
FIG. 11 shows a flow chart of the steps of one embodiment of the surface subdivision process of the present invention.

FIG. 11 shows a flow chart of the steps 1100 of one embodiment of the surface subdivision process of the present invention. In step 1101, the surface subdivision process of the present invention receives a polygon mesh of a surface to be subdivided. In step 1102, the present invention determines whether the polygons comprising the polygon mesh of the surface to be subdivided are triangle polygons (triangles), or some other type of polygons (e.g., quadrilateral polygons). If the polygons comprising the polygon mesh are triangle polygons, the present invention proceeds to step 1103. In step 1103, neighboring triangle polygons are paired, and the triangle polygon pairs are subsequently pulled from the polygon mesh and stored into a 2D array in step 1105.

If the polygons comprising the polygon mesh are quadrilateral polygons (i.e., some other type of polygon), the present invention proceeds to step 1104. In step 1104, the quadrilateral polygons are pulled directly from the polygon mesh without pairing, and stored into the 2D array in step 1105. In step 1106, the sliding window process of the present invention subdivides the polygons in the 2D array, outputting fully subdivided strips of polygons to the graphics pipeline of the computer system for rendering, until the entire 2D array is processed. The surface subdivision process of the present embodiment then ends in step 1107.

For illustration purposes, details of particular types of triangle polygon edges, and details of particular types of "triangle based" subdivision surfaces, are described below in order to provide examples of surface subdivision in accordance with the present invention.

The edges and vertices in a polygon mesh can be of the following types. An edge can be either smooth (continuous surface normals) or a crease (discontinuous surface normals). A vertex can be either smooth, dart, crease, or corner, depending whether it has zero, one, two, or more incident crease edges, respectively. A crease vertex is regular if there are exactly two smooth edges between the two creases, otherwise it is non regular. Additionally, any vertex can be tagged as a conical vertex.

Figures 12, 13:
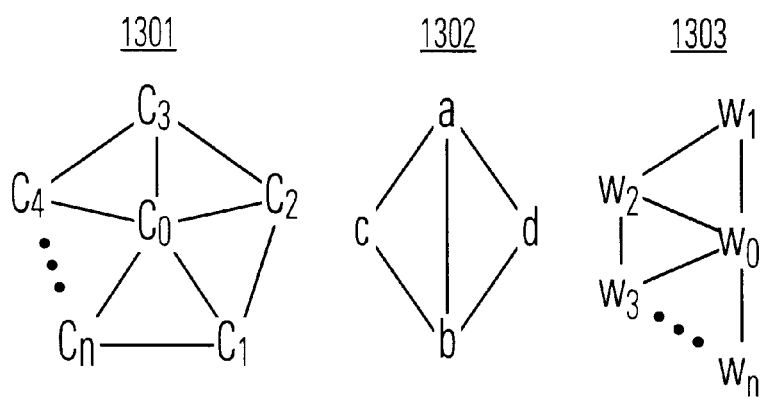
FIG. 12 shows a table having the masks for subdivision and final locations in accordance with the present invention.
FIG. 13 shows the masks used for subdividing and calculating the final positions in accordance with the present invention.

FIG. 12 shows a table 1200, which gives the masks for subdivision (S) and final locations (F)[1]. In formulas $f$ oi is 1 if the edge co-ci is a crease, and is 0 otherwise, $a(n)=5/8-(3+2\cos(2\pi/n))^2/64$, and $b(n)=(3+2\cos(2\pi/(n))/8$.

FIG. 13 shows the mask 1301, mask 1302, and mask 1303 which are used in subdivisions and computing final locations. The mask 1302 is used when subdividing edges (between a and b). If the edge is smooth or if either of the vertices (a or b) is a dart, the weights $\{a,b,c,d\}$ are $\{3,3,1,1\}$. If the edge is a crease and one of the edge vertices (a) is a regular crease while the other (b) is either non-regular crease or corner, the weights are $\{5,3,0,0\}$. In the remaining cases the weights are $\{1,1,0,0\}$.

The normal vectors can be calculated by taking the cross product of two surface tangent vectors u1 and u2. For non-crease vertices, we use the mask 1301. The center weight co is 0 for both u1 and u2, while $ci=\cos(2\pi i/n)$ for u1 and $c1=\cos(2\pi(i-1)/n)$ for u2. For crease vertices we use the mask 1303 (the fat line denotes the crease), where u1 goes along the crease and u2 across the crease. The u1 weights are w1=1, wn=-1, other w's are 0. For a regular crease vertex, u2 weights $\{w0 \ldots w4\}$ are $\{-2,-1,2,-1\}$. For a non-regular crease vertex, u2 weights are: for $n\geq 4$, wo=0, $w1=wn=\sin\emptyset$, and $wt=(2\cos\emptyset-2)(\sin(i-1)\emptyset)$ for $1<i<n$, where $\emptyset=\pi/(n-1)$, for n=3, $\{wo \ldots w3\}$ are $\{-1,0,1,0\}$: for n=2, $\{wo, w1, w2\}$ are $\{-2,1,1\}$.

Figure 14:
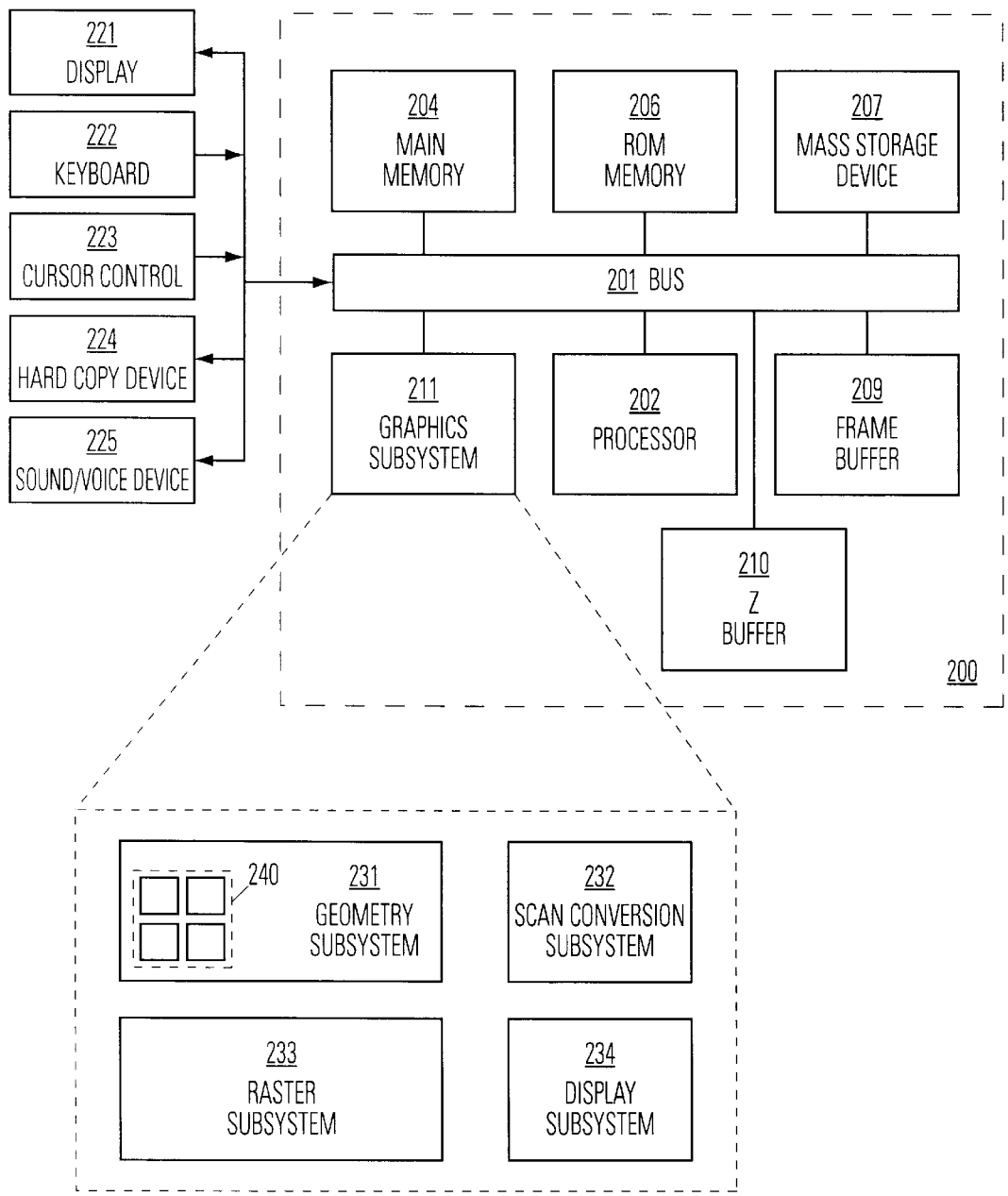
FIG. 14 shows a computer system upon which the present invention may be practiced.

Referring now to FIG. 14, a computer system upon which the present invention may be practiced is shown as 200. Computer system 200 includes any computer controlled graphics systems for generating complex or 3 dimensional images. Computer system 200 includes a bus 201 for transmitting digital information between the various parts of the computer system. One or more microprocessors 202 are coupled to bus 201 for processing information. The information along with the instructions of how the information is to be processed are stored in a hierarchical memory system comprised of mass storage device 207, read only memory 206, main memory 204, and static random access memory (SRAM) 203. Mass storage device 207 is used to store vast amounts of digital data. The mass storage device 207 can consist one or more hard disk drives, floppy disk drives, optical disk drives, tape drives, CD ROM drives, or any number of other types of storage devices having media for storing data digitally. A read only memory (ROM) 206 is used to store digital data of a permanent basis, such as instructions for the microprocessors. Main memory 204 is used for storing digital data on an intermediate basis. Main memory 204 can be dynamic random access memory (DRAM).

A 3D graphics rendering system 211 is an option which can be included in system 200. Processor 202 provides the graphics system 211 with graphics data, such as drawing Commands, coordinate vertex data, and other data related to an object's geometric position, color, texture, shading, and other surface parameters. The object data is processed by graphics system 211 in the following four pipelined stages: geometry subsystem 231, scan conversion subsystem 232, raster subsystem 233, and a display subsystem 234. The geometry subsystem 231 converts the graphical data from processor 202 into a screen coordinate system.

Geometry subsystem 231 includes a number of graphics co-processors 240. The graphics co-processors (sometimes referred to as geometry engines) perform much of the geometry manipulation (e.g., polygon translations, rotations, displacements in 3D space, and the like), thereby speeding the performance of the computer system 200. It is the function of the geometry subsystem 231 to perform the projection and transformation process to give depth to a displayed object. The resulting primitives (points, lines, polygons, polyhedra, and the like) supplied by the geometry subsystem 231 are then supplied to the scan conversion subsystem 232. It is the function of the scan conversion subsystem 232 to then generate pixel data based on these primitives. The scan conversion subsystem 232 performs the interpolation functions to interpolate straight lines so that each intermediate value need not be individually and separately calculated by the geometry subsystem. Next, the pixel data is sent to the raster subsystem 233, whereupon Z-buffering, blending, texturing, and antialiasing functions are performed. The resulting pixel values are subsequently stored in frame buffer 209, and the Z values are stored in the Z buffer 210. The display subsystem 234 reads the frame buffer 209 and displays the image on monitor 221.

Several other devices may also be coupled to system 200. For example, an alphanumeric keyboard 222 is used for inputting commands and other information to processor 202. Another type of user input device is cursor control device 223 (a mouse, trackball, joystick, and the like) used for positioning a movable cursor and selecting objects on a computer screen. Another device which may be coupled to bus 201 is a hard copy device 224 (e.g., a laser printer) for printing data or other information onto a tangible medium. Additionally, a sound recording or video option 225 can be coupled to the system 200 to provide multimedia capabilities.

The present invention, a method and system for efficiently drawing subdivision surfaces, is thus disclosed. While the present invention has been described in particular embodiments, it should be appreciated that the present invention should not be construed as limited by such embodiments, but rather construed according to the below claims.

What is claimed is:

1. In a computer system having a processor and a display, a computer implemented method for computing a subdivision surface by incrementally processing and outputting the subdivision surface to a final subdivision level to more accurately render a 3 dimensional (3D) surface, the method comprising the computer implemented steps of:

a) pulling polygons from a polygon mesh of a 3D surface;
   b) storing the polygons into a 2 dimensional array such that the vertices of the polygons occupy nodes of the 2 dimensional array;
   c1) subdividing the polygons stored in a first portion of the 2 dimensional array into resulting polygons;
   c2) outputting the resulting polygons stored in the first portion to the graphics pipeline such that memory previously storing the first portion can be reused, wherein the resulting polygons stored in the first portion have been subdivided by at least three levels;

c3) subdividing the polygons stored in a second portion of the 2 dimensional array into resulting polygons;

c4) outputting the resulting polygons stored in the second portion to the graphics pipeline; and d) outputting the resulting polygons into a graphics pipeline wherein the graphics pipeline renders the resulting polygons into a 3D image on a computer display.

2. The method of claim 1 further including the step of subdividing the polygons stored in the 2 dimensional array by using a plurality of graphics co-processors in the computer system.

3. The method of claim 1 further comprising the steps of:

a1) pulling a plurality of triangle polygon pairs from the polygon mesh, when the polygon mesh is built with a plurality of triangle polygons; and b1) storing the plurality of triangle polygon pairs into the 2 dimensional array such that the vertices of the plurality of polygon pairs occupy the nodes of the 2 dimensional array.

4. The method of claim 3, wherein step a1) further comprises the step of pulling the plurality of triangle polygon pairs from the polygon mesh such that the polygon mesh is not broken into a plurality of discontiguous polygon meshes.

5. The method of claim 4, wherein step a1) further comprises the steps of:

assigning a priority to each of the plurality of triangle polygons such that triangle polygons, out of the plurality of triangle polygons, having a larger number of neighboring polygons are assigned a higher priority; and pairing the triangle polygons, out of the plurality of triangle polygons, having the higher priority before pairing other triangle polygons, out of the plurality of polygons.

6. The method of claim 1 further comprising the steps of:

a2) pulling a plurality of quadrilateral polygons from the polygon mesh, when the polygon mesh is built with a plurality of quadrilateral polygons; and b2) storing the plurality of quadrilateral polygons into the 2 dimensional array such that the vertices of the plurality of quadrilateral polygons occupy the nodes of the 2 dimensional array.

7. The method of claim 1, further comprising the steps of:

determining whether the resulting polygons stored in the first portion are at a final subdivision level;

subdividing the resulting polygons stored in the first portion, if the resulting polygons stored in the first portion are not at a final subdivision level, comprising the steps of:

subdividing the polygons stored in the first portion into resulting polygons at the final subdivision level;

calculating final positions and normals for the resulting polygons stored in the first portion; and outputting the resulting polygons at the final subdivision level stored in the first portion before subdividing the polygons in the second portion.

8. The method of claim 1 further including the step of subdividing the polygons stored in the 2 dimensional array by using a plurality of central processing units in the computer system.

9. In a computer system having a processor and a display for visually displaying 3 dimensional (3D) surfaces, a computer implemented method for computing a subdivision surface by incrementally processing and outputting the subdivision surface to a final subdivision level, the surface modeled by a polygon mesh built with triangle polygons (triangles), the method comprising the computer implemented steps of:

a) pulling a plurality of triangles from a triangle mesh in a plurality of triangle pairs;

b) storing the plurality of triangle pairs into a 2 dimensional array such that the vertices of the plurality of triangle pairs occupy nodes of the 2 dimensional array;

c1) subdividing the triangles stored in a first portion of the 2 dimensional array into resulting triangles;

c2) outputting the resulting triangles stored in the first portion such that memory previously storing the first portion can be reused, wherein the resulting polygons stored in the first portion have been subdivided by at least three levels;

c3) subdividing the triangles stored in a second portion of the 2 dimensional array into resulting triangles;

c4) outputting the resulting triangles stored in the second portion; and d) outputting the plurality of resulting triangles.

10. The method of claim 9 further including the steps of:

of subdividing the triangles stored in the 2 dimensional array by using a plurality of graphics co-processors in the computer system; and outputting the plurality of resulting triangles into a graphics pipeline, wherein the graphics pipeline renders the plurality of resulting triangles into a 3D image on a computer display.

11. The method of claim 9, wherein step a) further comprises the step of pulling the plurality of triangle pairs from the triangle mesh such that the triangle mesh is not broken into a plurality of discontiguous triangle meshes.

12. The method of claim 9 wherein step c) further comprises steps of:

c1) subdividing the triangles stored in a first portion of the 2 dimensional array into resulting triangles;

c2) outputting the resulting triangles stored in the first portion;

c3) subdividing the triangles stored in a second portion of the 2 dimensional array into resulting triangles; and, c4) outputting the resulting triangles stored in the second portion.

13. The method of claim 9, further comprising the steps of:

determining whether the resulting triangles stored in the first portion are at a final subdivision level;

subdividing the resulting triangles stored in the first portion, if the resulting triangles stored in the first portion are not at a final subdivision level, the subdividing comprising the steps of:

subdividing the triangles stored in the first portion into resulting triangles at the final subdivision level;

calculating final positions and normals for the resulting triangles stored in the first portion; and outputting the resulting triangles stored in the first portion before subdividing the triangles in the second portion.

14. The method of claim 9 further including the step of partitioning the 2 dimensional array storing the plurality of triangles and subdividing the triangles stored in the 2 dimensional array by using a plurality of central processing units in the computer system.

15. A computer system having a processor coupled to a bus and a memory coupled to the bus, the memory for containing a set of instructions that when executed by the processor causes the computer system to implement a method of computing a subdivision surface by incrementally processing and outputting the subdivision surface to a final subdivision level to more accurately render a 3 dimensional (3D) surface, the method comprising the computer system performing the steps of:

a) pulling polygons from a polygon mesh of a 3D surface;
 b) storing the polygons into a 2 dimensional array such that the vertices of the polygons occupy nodes of the 2 dimensional array;
 c1) subdividing the polygons stored in a first portion of the 2 dimensional array into resulting polygons;
 c2) outputting the resulting polygons stored in the first portion to the graphics pipeline such that memory previously storing the first portion can be reused, wherein the resulting polygons stored in the first portion have been subdivided by at least three levels;
 c3) subdividing the polygons stored in a second portion of the 2 dimensional array into resulting polygons;
 c4) outputting the resulting polygons stored in the second portion to the graphics pipeline; and
 d) outputting the resulting polygons into a graphics pipeline wherein the graphics pipeline renders the resulting polygons into a 3D image on a computer display.

16. The method of claim 15 further including the step of subdividing the polygons stored in the 2 dimensional array by using a plurality of graphics co-processors in the computer system.

17. The method of claim 15 further comprising the steps of:

a1) pulling a plurality of triangle polygon pairs from the polygon mesh, when the polygon mesh is built with a plurality of triangle polygons; and
 b1) storing the plurality of triangle polygon pairs into the 2 dimensional array such that the vertices of the plurality of polygon pairs occupy the nodes of the 2 dimensional array.

18. The method of claim 17, wherein step a1) further comprises the step of pulling the plurality of triangle polygon pairs from the polygon mesh such that the polygon mesh is not broken into a plurality of discontiguous polygon meshes.

19. The method of claim 18, wherein step a1) further comprises the steps of:

assigning a priority to each of the plurality of triangle polygons such that triangle polygons, out of the plurality of triangle polygons, having a larger number of neighboring polygons are assigned a higher priority; and
 pairing the triangle polygons, out of the plurality of triangle polygons, having the higher priority before pairing other triangle polygons, out of the plurality of polygons.

20. The method of claim 15 further comprising the steps of:

a2) pulling a plurality of quadrilateral polygons from the polygon mesh, when the polygon mesh is built with a plurality of quadrilateral polygons; and
 b2) storing the plurality of quadrilateral polygons into the 2 dimensional array such that the vertices of the plurality of quadrilateral polygons occupy the nodes of the 2 dimensional array.

21. The method of claim 15, further comprising the steps of:

determining whether the resulting polygons stored in the first portion are at a final subdivision level;
 subdividing the resulting polygons stored in the first portion, if the resulting polygons stored in the first portion are not at a final subdivision level, comprising the steps of:
  subdividing the polygons stored in the first portion into resulting polygons at the final subdivision level;
  calculating final positions and normals for the resulting polygons stored in the first portion; and
  outputting the resulting polygons at the final subdivision level stored in the first portion before subdividing the polygons in the second portion.

22. The method of claim 15 further including the step of subdividing the polygons stored in the 2 dimensional array by using a plurality of central processing units in the computer system.

23. In a graphics computer system for rendering 3D images, a computer implemented method for efficiently computing a subdivision surface of a 3D object by incrementally processing and outputting the subdivision surface to a final subdivision level, the method comprising the computer implemented steps of:

pulling polygons from a polygon mesh representative of a 3D surface;
 storing the polygons into a 2 dimensional array such that the vertices of the polygons occupy nodes of the 2 dimensional array, the 2 dimensional array realized in a computer readable memory;
 incrementally processing the 2 dimensional array to a final subdivision level using a sliding window process comprising the steps of:
  a) storing an initial portion of the 2 dimensional array into intermediate storage to initialize a window of the 2 dimensional array for processing;
  b) incrementally calculating subdivision vertex coordinates for each row of the initial portion;
  c) upon subdividing one row of the initial portion to a final subdivision level, wherein the one row has been subdivided by at least three levels, transferring the one row from intermediate storage to a graphics pipeline for rendering;
  d) replacing the one row in the initial portion with a subsequent row of the 2 dimensional array to reuse memory previously occupied by the one row; and
  e) repeating steps b) through d) until the 2 dimensional array is processed to a final subdivision level, such that the window for processing the 2 dimensional array slides from the initial portion through the entirety of the 2 dimensional array.

24. The method of claim 23, wherein the intermediate storage is a subportion of the computer readable memory which stores the 2 dimensional array, and wherein the sliding window process enables the processing of the 2 dimensional array to the final subdivision level without geometrically expanding an amount of the computer readable memory occupied by the 2 dimensional array.

25. The method of claim 23, wherein the sliding window process stores three rows of the 2 dimensional array for each level of subdivision in the initial portion.

26. The method of claim 25, wherein an additional two rows of the 2 dimensional array are stored in the initial portion for computing final vertex coordinates and normal vectors.

27. The method of claim 23, wherein the sliding window processes progresses through the 2 dimensional array processing successive 3 row increments of the 2 dimensional array.

28. In a graphics computer system for rendering 3D images, a computer implemented method for efficiently computing a subdivision surface of a 3D object by incrementally processing and outputting the subdivision surface to a final subdivision level, the method comprising the computer implemented steps of:

pulling polygons from a polygon mesh representative of a 3D surface;

storing the polygons into a 2 dimensional array such that the vertices of the polygons occupy nodes of the 2 dimensional array, the 2 dimensional array realized in a computer readable memory;

incrementally processing the 2 dimensional array to a final subdivision level using a sliding window process comprising the steps of:

a) storing an initial 3 rows of the 2 dimensional array into intermediate storage to initialize a window of the 2 dimensional array for processing, wherein the initial 3 rows are at a subdivision level J;

b) spliting the diagonal and vertical edges between the first and second row vertices of the initial 3 rows to obtain a first row support vertices at subdivision level J+1;

c) splitting the horizontal edges and updating the vertices between the first and second row vertices of the initial 3 rows to obtain a second row of support vertices at a subdivision level J+1;

d) splitting the vertical and diagonal edges connecting the second and third rows of the initial 3 rows to obtain a second row of support vertices at the subdivision level J+1;

e) storing a next row of vertices from the 2 dimensional array as a subsequent row of the initial portion such that the edges of the next row at level j provide neighbors needed for splitting the horizontal edges and updating the vertex coordinates in the middle rows, and such that resulting new and updated vertices become a new lowest row at level j+1;

f) repeating steps b–e until the first row is at a final subsivision level J+i, wherein the first row has been subdivided by at least three levels, and outputting the first row to a graphics pipeline for rendering and replacing the first row with a new row from the 2 dimensional array to reuse memory previously occupied by the first row; and g) repeating steps b) through f) until the entire 2 dimensional array has been processed and rendered at the final subdivision level J+i such that the window for processing the 2 dimensional array slides from the initial three rows through the entirety of the 2 dimensional array.

29. The method of claim 28, wherein the intermediate storage is a subportion of the computer readable memory which stores the 2 dimensional array, and wherein the sliding window process enables the processing of the 2 dimensional array to the final subdivision level without geometrically expanding an amount of the computer readable memory occupied by the 2 dimensional array.

30. In a graphics computer system for rendering 3D images, a computer implemented method for efficiently computing a subdivision surface of a 3D object by incrementally processing and outputting the subdivision surface to a final subdivision level, the method comprising the computer implemented steps of:

pulling triangle polygons from a polygon mesh representative of a 3D surface, wherein the triangle polygons are pulled from the polygon mesh using a pairing algorithm, wherein the triangle polygons are pulled from the polygon mesh in unique pairs without breaking the polygon mesh into discontiguous portions;

storing the unique pairs of triangle polygons into a 2 dimensional array such that the vertices of the triangle polygons occupy nodes of the 2 dimensional array, the 2 dimensional array realized in a computer readable memory;

incrementally processing the 2 dimensional array to a final subdivision level using a sliding window process comprising the steps of:

a) storing an initial portion of the 2 dimensional array into intermediate storage to initialize a window of the 2 dimensional array for processing;

b) incrementally calculating subdivision vertex coordinates for each row of the initial portion;

c) upon subdividing one row of the initial portion to a final subdivision level, wherein the one row has been subdivided by at least three levels, and transferring the one row from intermediate storage to a graphics pipeline for rendering;

d) replacing the one row in the initial portion with a subsequent row of the 2 dimensional array to reuse memory previously occupied by the one row; and e) repeating steps b) through d) until the 2 dimensional array is processed to a final subdivision level, such that the window for processing the 2 dimensional array slides from the initial portion through the entirety of the 2 dimensional array.

31. The method of claim 30, wherein the pairing algorithm includes the steps of:

f) inserting each triangle polygon of the polygon mesh into one of a plurality of priority sets as determined by a number of unpaired neighboring triangle polygons, wherein triangle polygons with 0 or 1 free neighboring triangle polygons are assigned to a highest priority set, and the triangles with 3 free neighbors are assigned to a lowest priority set;

g) selecting a triangle from a highest non-empty priority set and pairing it with a neighboring triangle polygon the highest priority set;

h) pulling the paired triangles from the polygon mesh; and i) promoting a remaining neighboring triangle polygon to a higher priority set; and repeating steps j) through k) to pull all triangle polygons from the polygon mesh.

* * * * *